United States Patent
Long et al.

(10) Patent No.: US 9,497,568 B2
(45) Date of Patent: Nov. 15, 2016

(54) METHOD AND APPARATUS FOR CONTROLLING NETWORK ACCESS OF MACHINE TERMINAL

(71) Applicant: Huawei Device Co., LTD, Shenzhen (CN)

(72) Inventors: Shuiping Long, Beijing (CN); Guodong Xue, Beijing (CN); Hui Jin, Beijing (CN); Xiaoyan Duan, Beijing (CN); Xiaojuan Li, Beijing (CN)

(73) Assignee: HUAWEI DEVICE CO. LTD., Shenzhen (CN)

( * ) Notice: Subject to any disclaimer, the term of this patent is extended or adjusted under 35 U.S.C. 154(b) by 344 days.

(21) Appl. No.: 13/850,793

(22) Filed: Mar. 26, 2013

(65) Prior Publication Data

US 2013/0208646 A1     Aug. 15, 2013

Related U.S. Application Data

(63) Continuation of application No. PCT/CN2011/080140, filed on Sep. 24, 2011.

(30) Foreign Application Priority Data

Sep. 26, 2010 (CN) .......................... 2010 1 0295031

(51) Int. Cl.
*H04W 4/00* (2009.01)
*H04W 48/02* (2009.01)
(Continued)

(52) U.S. Cl.
CPC ............ *H04W 4/005* (2013.01); *H04L 63/108* (2013.01); *H04W 12/08* (2013.01); *H04W 48/02* (2013.01); *H04W 48/06* (2013.01); *H04W 48/10* (2013.01)

(58) Field of Classification Search
CPC ...... H04L 12/26; H04W 4/00; H04W 4/005; H04W 28/02; G01S 5/145; H04M 11/04
See application file for complete search history.

(56) References Cited

U.S. PATENT DOCUMENTS

2007/0298761 A1* 12/2007 Bani Hani .............. G01S 5/145
455/404.2
2010/0057485 A1   3/2010 Luft
(Continued)

FOREIGN PATENT DOCUMENTS

| CN | 101686572 A | 3/2010 |
| EP | 2096884 A1  | 9/2009 |
| EP | 2192807 A1  | 6/2010 |

OTHER PUBLICATIONS

3rd Generation Partnership Project; Technical Specification Group Services and System Aspects; System Improvements for Machine-Type Communications; (Release 10), 3GPP TR 23.888 V0.5.01, Jul. 2010, 76 pages.
(Continued)

*Primary Examiner* — Andrew Lai
*Assistant Examiner* — Leon Andrews
(74) *Attorney, Agent, or Firm* — Slater Matsil, LLP

(57) ABSTRACT

Embodiments of the present invention disclose a method, an apparatus, and a system for controlling network access of a machine terminal. In the embodiments of the present invention, an authorized period and/or a forbidden period of a time-controlled subscription is generated according to information such as network service load historical data of a network and application information of the time-controlled subscription. Network access of the machine terminal is controlled according to the authorized period and/or the forbidden period. Because the network access time of the machine terminal can be controlled flexibly, the communication of the machine terminal can be controlled flexibly, and impacts of machine terminal communication on ordinary terminal communication can be reduced.

17 Claims, 8 Drawing Sheets

(51) Int. Cl.
*H04L 29/06* (2006.01)
*H04W 12/08* (2009.01)
*H04W 48/06* (2009.01)
*H04W 48/10* (2009.01)

(56) References Cited

U.S. PATENT DOCUMENTS

| 2010/0146117 A1 | 6/2010 | Hoeksel |
| 2010/0227611 A1 | 9/2010 | Schmidt et al. |
| 2011/0098020 A1 | 4/2011 | Van Loon et al. |
| 2012/0033551 A1* | 2/2012 | Liao .................... H04W 28/02 370/230 |

OTHER PUBLICATIONS

3rd Generation Partnership Project; Technical Specification Group Services and System Aspects; System Improvements for Machine-Type Communications; (Release 10), 3GPP TR 23.888 V0.5.1, Jul. 2010, 75 pages.

3rd Generation Partnership Project; Technical Specification Group Services and System Aspects; Service requirements for Machine-Type Communications (MTC); Stage 1 (Release 10), 3GPP TS 22.368 V10.1.0, Jun. 2010, 25 pages.

ETRI, "Management of Access Grant Time Interval," 3GPP TSG SA WG2 Meeting #79, TD S2-102349, Kyoto, Japan, May 10-14, 2010, 3 pages.

Kpn, et al., "Clarification of time controlled," 3GPP TSG-SA1 #49, S1-100109, San Francisco, California, Feb. 22-26, 2010, 4 pages.

International Search Report received in International Application No. PCT/CN2011/080140, mailed Jan. 5, 2012, 3 pages.

Written Opinion of the International Searching Authority received in International Application No. PCT/CN2011/080140, mailed Jan. 5, 2012, 11 pages.

3rd Generation Partnership Project: Technical Specification Group Servies, System Aspects, System Improvements for Machine-Type Communications; (Release 10), 3 GPP TR 23.888 V0.5.1, Jul. 2010, 72 pages.

3rd Generation Partnership Project; Technical Specification Group Services and System Aspects, Service requirements for Machine-T Communication (MTC); Stage 1 (Release 10), 3GPP TS 22.368 V10.1.0, Jun. 2010, 23 pages.

ETRI, "Management of Access Grant Time Interval," 3GPP TSG SA WG2 Meeting #79, TD S2-202349, Kyoto, Japan, May 10-14, 2010, 4 pages.

Kpn, et al., "Clarification of time controlled," 3GPP TSG-SA1 #49, S1-100109, San Francisco, USA, Feb. 22-26, 2010, 4 pages.

Chinese Office Action received in Application No. 201010295031.6 mailed Sep. 4, 2013, 5 pages.

Chinese Search Report received in Application No. 2010102950316 mailed Aug. 27, 2013, 3 pages.

3rd Generation Partnership Project; Techical Specification Group Services and System Aspects; System Improvements for Machine-Type Communications; (Release 10), 3GPP TR 23.888 V1.0.0, Jul. 2010, 80 pages.

Extended European Search Report received in Application No. 11826429.0-1854 mailed Sep. 9, 2013, 10 pages.

LG Electronics Inc., "Use of Broadcast Solutions for MTC," 3GPP TSG-RAN WG2 #69bis, R2-102125, Beijing China, Apr. 12-17, 2010, 2 pages.

LG Electronics Inc., "PWS-like Broadcast for MTC," 3GPP TSG-RAN WG2 #70bis, R2-103701, Stockholm, Sweden, Jun. 28-Jul. 2, 2010, 2 pages.

Kpn, "Time control for MTC Feature Time Controlled" 3GPP TSG SA WG2 Meeting #79, TD S2-102588, Kyoto, Japan, May 10-14, 2010, 2 pages.

* cited by examiner

METHOD AND APPARATUS FOR CONTROLLING NETWORK ACCESS OF MACHINE TERMINAL

CROSS-REFERENCE TO RELATED APPLICATIONS

This application is a continuation of international Application No. PCT/CN2011/080140, filed on Sep. 24, 2011, which claims priority to Chinese Patent Application No. 201010295031.6, filed on Sep. 26, 2010, each of which is incorporated herein by reference in its entirety.

TECHNICAL FIELD

The present invention relates to the field of communication technologies, and in particular, to a method and an apparatus for controlling network access of a machine terminal.

BACKGROUND

The Internet and radio communication network have become an indispensable infrastructure for people to obtain information and communicate with others. With the popularity of the Internet and mobile network coverage, the Internet of Things was established, which uses the Internet and a mobile network as a tool for communication between things, a tool for communication between human beings and things, and even a tool for communication between human beings and nature. The intelligent system brought by the Internet of Things can effectively save energy, enhance food safety, improve production efficiency, improve the nature and urban living environment, and so on.

Machine to machine (M2M) communication is an interpretation of the Internet of Things from the perspective of communication. The M2M generally refers to all technologies and means for establishing connections and communication between human beings, machines, and systems. It provides a convenient method for establishing connections of real-time data between systems, between remote devices, and between individuals, which can implement automated and intelligent service procedures to the greatest extent.

Machine type communication (MTC) is a kind of data communication put forward by the Third Generation Partnership Project (3GPP) from the perspective of M2M communication, and involves one or more entities not requiring human interaction. In MTC communication, terminals may be classified into machine terminals (i.e., MTC devices) and terminals used by ordinary users. For ease of description, the terminals used by ordinary users are referred to as ordinary terminals hereinafter. In the prior art, a network treats the machine terminals and the ordinary terminals in MTC communication equally, that is, there is no difference between network access of a machine terminal and network access of an ordinary terminal.

With the wide deployment of M2M applications, the quantity of machine terminals is gradually increasing. The communication of machine terminals affects the communication of ordinary terminals. For example, because the machine communication occupies more radio resources, the service initiation success ratio and call quality of mobile phones are reduced.

SUMMARY OF THE INVENTION

Embodiments of the present invention provide a method and an apparatus for controlling network access of a machine terminal, which can control access of the machine terminal flexibly to reduce impacts of machine terminal communication on ordinary terminal communication.

In one aspect, a method for controlling network access of a machine terminal is provided. An authorized period and/or a forbidden period of a time-controlled subscription is generated according to requirement information. The requirement information includes application information of the time-controlled subscription and network service load historical data. The authorized period and/or the forbidden period is notified to the machine terminal. Access of the machine terminal is controlled according to the authorized period and/or the forbidden period after receiving an access request of the machine terminal.

In another aspect, a method for controlling network access of a machine terminal is provided. An authorized period and/or a forbidden period of a time-controlled subscription according to requirement information. The requirement information includes application information of the time-controlled subscription and network service load historical data. A local authorized period and/or forbidden period is generated according to the authorized period and/or forbidden period of the time-controlled subscription and a predetermined local policy. The local authorized period and/or forbidden period is sent to the machine terminal. Access of the machine terminal is controlled according to the local authorized period and/or forbidden period after receiving an access request of the machine terminal. A communication window may be randomly generated within the local authorized period and/or a non-forbidden period. The communication window is sent to the machine terminal. The access of the machine terminal is controlled according to the communication window after receiving the access request of the machine terminal.

In another aspect, a method for controlling network access of a machine terminal is provided. Time synchronization is performed with a network-side system. The process obtains an authorized period and/or a forbidden period of a time-controlled subscription, a local authorized period and/or forbidden period, or a communication window. The authorized period and/or forbidden period of the time-controlled subscription is generated by a network-side device according to requirement information. The requirement information includes application information of the time-controlled subscription and network service load historical data. The local authorized period and/or forbidden period is generated by the network-side device according to the authorized period and/or forbidden period of the time-controlled subscription and a predetermined local policy. The communication window is randomly generated by the network-side device within the local authorized period and/or a non-forbidden period. An access request is sent to the network-side device according to at least one parameter of the obtained authorized period and/or forbidden period of the time-controlled subscription, local authorized period and/or forbidden period, or communication window. A network is accessed when the network-side device determines to allow the access according to the access request and at least one parameter of the authorized period and/or forbidden period of the time-controlled subscription, the local authorized period and/or forbidden period, or the communication window stored by the network-side device.

In another aspect, a network-side device is provided and includes a generating unit, a notifying unit, and a processing unit. The generating unit is configured to generate an authorized period and/or a forbidden period of a time-controlled subscription according to requirement information. The requirement information includes application information of the time-controlled subscription and network service load historical data. The notifying unit is configured to notify the authorized period and/or the forbidden period generated by the generating unit to a machine terminal. The processing unit is configured to control access of the machine terminal according to the authorized period and/or the forbidden period generated by the generating unit after receiving an access request of the machine terminal.

In another aspect, a network-side device is provided and includes a generating unit, a local generating unit, and a processing unit. The generating unit is configured to generate an authorized period and/or a forbidden period of a time-controlled subscription according to requirement information. The requirement information includes application information of the time-controlled subscription and network service load historical data. The local generating unit is configured to generate a local authorized period and/or forbidden period according to the authorized period and/or forbidden period of the time-controlled subscription generated by the generating unit and a predetermined local policy. The processing unit is configured to send the local authorized period and/or forbidden period generated by the local generating unit to a machine terminal, and control access of the machine terminal according to the local authorized period and/or forbidden period after receiving an access request of the machine terminal. Alternatively, the processing unit is configured to randomly generate a communication window within the local authorized period generated by the local generating unit and/or a local non-forbidden period and send the communication window to the machine terminal, and control the access of the machine terminal according to the communication window after receiving the access request of the machine terminal.

In another aspect, a machine terminal is provided and includes a synchronizing unit, an obtaining unit, a sending unit, and an accessing unit. The synchronizing unit is configured to perform time synchronization with a network-side system. After the synchronizing unit performs the time synchronization, the obtaining unit is configured to obtain at least one parameter of an authorized period and/or a forbidden period of a time-controlled subscription, a local authorized period and/or forbidden period or a communication window. The authorized period and/or forbidden period of the time-controlled subscription is generated by a network-side device according to requirement information, where the requirement information includes application information of the time-controlled subscription and network service load historical data. The local authorized period and/or forbidden period is generated by the network-side device according to the authorized period and/or forbidden period of the time-controlled subscription and a predetermined local policy. The communication window is randomly generated by the network-side device within the local authorized period and/or a non-forbidden period. The sending unit is configured to send an access request to the network-side device according to at least one parameter of the authorized period and/or forbidden period of the time-controlled subscription, the local authorized period and/or forbidden period, or the communication window obtained by the obtaining unit. The accessing unit is configured to access a network when the network-side device determines to allow the access according to the access request and at least one parameter of the authorized period and/or forbidden period of the time-controlled subscription, the local authorized period and/or forbidden period, or the communication window stored by the network-side device.

In the embodiments of the present invention, an authorized period and/or a forbidden period of a time-controlled subscription is generated according to information such as network service load historical data of the network and application information of the time-controlled subscription. Network access of a machine terminal is controlled according to the authorized period and/or the forbidden period. Because the network access time of the machine terminal can be controlled flexibly, communication of the machine terminal can be controlled flexibly, and impacts of machine terminal communication on ordinary terminal communication can be reduced.

BRIEF DESCRIPTION OF THE DRAWINGS

To illustrate the technical solutions in the embodiments of the present invention more clearly, the accompanying drawings required for describing the embodiments are introduced and briefly described below. The accompanying drawings in the following description only show some embodiments of the present invention and persons of ordinary skill in the art may derive other embodiments from these accompanying drawings without creative efforts.

DETAILED DESCRIPTION OF ILLUSTRATIVE EMBODIMENTS

The technical solutions of the embodiments of the present invention are hereinafter described clearly with reference to the accompanying drawings. The described embodiments are only some exemplary embodiments of the present invention, rather than all embodiments. All other embodiments obtained by persons of ordinary skill in the art based on the embodiments of the present invention without creative efforts shall fall within the protection scope of the present invention.

Embodiments of the present invention provide a method, an apparatus, and a system for controlling network access of a machine terminal. The embodiments of the present invention are respectively described in detail below.

A first embodiment is described from the perspective of a network-side device. The network-side device may include at least one of a network management device, a gateway, an MTC server, an MTC platform, a home location register (HLR), or a home subscriber server (HSS).

Figure 1:
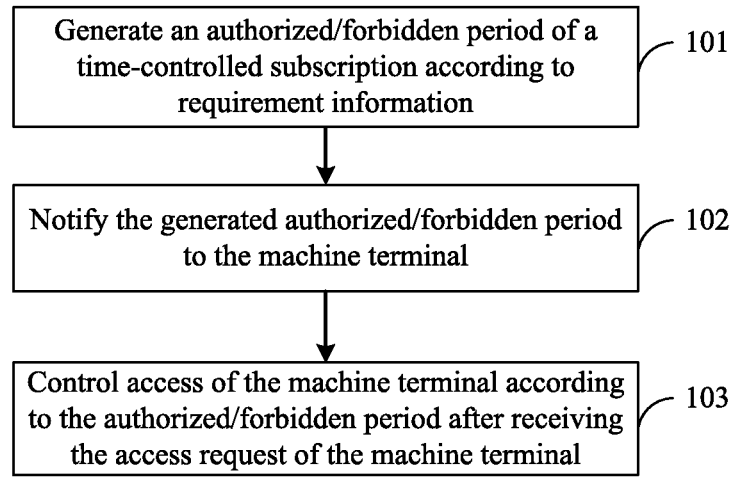
FIG. 1 is a flowchart of a control method according to a first embodiment of the present invention.

The specific procedure of a method for controlling network access of a machine terminal, as shown in FIG. 1, is provided. In step 101, an authorized period and/or a forbidden period of a time-controlled subscription is generated according to requirement information. The requirement information may include network service load historical data and application information of the time-controlled subscription. The time-controlled subscription refers to a subscription including a time-controlled feature. The application information of the time-controlled subscription may include information such as the quantity and service traffic of machine terminals of all time-controlled subscriptions or information such as the quantity and service traffic of MTC application machine terminals of a certain type of time-controlled subscriptions; and the requirement information may further include system maintenance time.

For example, the process may generate authorized periods and/or forbidden periods of all time-controlled subscriptions, or authorized periods and/or forbidden periods of a certain type of time-controlled subscriptions according to the requirement information.

As an example, the authorized period is defined as 3:20-4:00 a.m. every day. In this case, during 3:20-4:00 a.m. every day, machine terminals of all time-controlled subscriptions or a certain type of time-controlled subscriptions may communicate through a mobile network, while communication through the mobile network beyond this period is forbidden.

As another example, the forbidden period is defined as 9:00-22:00 every day. In this case, during 9:00-22:00 every day, machine terminals of all time-controlled subscriptions or a certain type of time-controlled subscriptions are forbidden to communicate through the mobile network, while communication through the mobile network beyond this period (i.e. 22:00-9:00, next day) is allowed.

Machine terminals of authorized periods and/or forbidden periods of all time-controlled subscriptions or a certain type of time-controlled subscriptions may be uniformly controlled. In addition, a machine terminal of a certain time-controlled subscription may be controlled by generating an authorized period and/or a forbidden period of a particular time-controlled subscription according to requirement information.

For example, an authorized period and/or a forbidden period may be generated for an automatic beverage-vending application device of seller according to the requirement information. Alternatively, an authorized period and/or a forbidden period may be generated for an automatic newspaper-vending application device of seller B according to the requirement information.

The requirement information may further include information about an authorized period and/or a forbidden period of an existing time-controlled subscription. In addition, the application information of the time-controlled subscription in the requirement information is specifically application information of a particular time-controlled subscription. For example, any combination of information such as an application type (e.g., an automatic vending machine, a meter reading, etc.), a preferential communication period, a communication frequency or cycle, average/maximum data amount, average/maximum communication duration, average/maximum data rate, quantity of machine terminals, and maintenance time of the MTC server may be used.

In step 102, the generated authorized period and/or forbidden period is notified to the machine terminal. For example, the authorized period and/or forbidden period may be broadcast to the machine terminals corresponding to all time-controlled subscriptions or a certain type of time-controlled subscriptions in broadcast mode by broadcasting the authorized period and/or forbidden period to the machine terminal through a cell broadcast service (CBS), or by broadcasting the authorized period and/or forbidden period to the machine terminal by a cell system parameter. Certainly, the authorized period and/or forbidden period may also be broadcast to the machine terminal in unicast mode.

As another example, the authorized period and/or forbidden period may also be notified to the machine terminal after a first access request of the machine terminal of the time-controlled subscription is received. In this case, the first access request sent by the machine terminal is received and the authorized period and/or forbidden period is sent to the machine terminal according to the first access request. The first access request refers to a request message for obtaining an authorized period and/or a forbidden period, and in this specific implementation, may be set according to protocol requirements corresponding to specific application environment. For example, the first access request may be specifically an Attach request.

In step 103, access of the machine terminal is controlled according to the authorized period and/or the forbidden period after receiving the access request of the machine terminal. For example, when the machine terminal has communication need and the current time falls within an authorized period (or a non-forbidden period), the machine terminal may execute a randomization operation for starting communication, that is, randomly select a certain time point within the authorized period to send the access request. After receiving the access request, the network-side device judges, according to the access request and the authorized period and/or forbidden period, whether the current time falls within the authorized period or falls beyond the forbidden period, and if so, allows the access of the machine terminal. Otherwise, if the current time falls beyond the authorized period or still falls within the forbidden period, the network-side device denies the access of the machine terminal or allows the access of the machine terminal but adds a label for the current access so that subsequent predetermined processing is performed according to the label such as, for example, extra charging. Optionally, the machine terminal may be prompted about the reason why the access is denied.

As used herein, the access request refers to various request messages sent by the machine terminal for accessing a network. In the specific implementation, different request messages may be used according to protocol requirements of different networks. For example, an Attach request message, a location update request, or a service request in a GPRS network may be used, the details of which are disclosed in the prior art and are not repeatedly described herein.

In addition, before the access of the machine terminal is controlled according to the authorized period and/or forbidden period, it may be judged whether the machine terminal is a machine terminal of the time-controlled subscription, and if so, the access of the machine terminal is controlled according to the authorized period and/or forbidden period. Otherwise, the access of the machine terminal may be not controlled.

As seen from the above, in this embodiment, an authorized period and/or a forbidden period of a time-controlled subscription is generated according to information such as network service load historical data and application information of a time-controlled subscription, and then network access of a machine terminal is controlled according to the authorized period and/or the forbidden period. Because the network access time of the machine terminal can be controlled flexibly, communication of the machine terminal can be controlled flexibly, and impacts of machine terminal communication on ordinary terminal communication can be reduced. For example, the machine terminal is allowed to access a network during a service valley period of an operator network as much as possible, which avoids possible network congestion, reduces impacts on the ordinary terminal communication, and also guarantees the communication quality of the machine terminal while ensuring the communication quality of an ordinary terminal.

Figure 2:
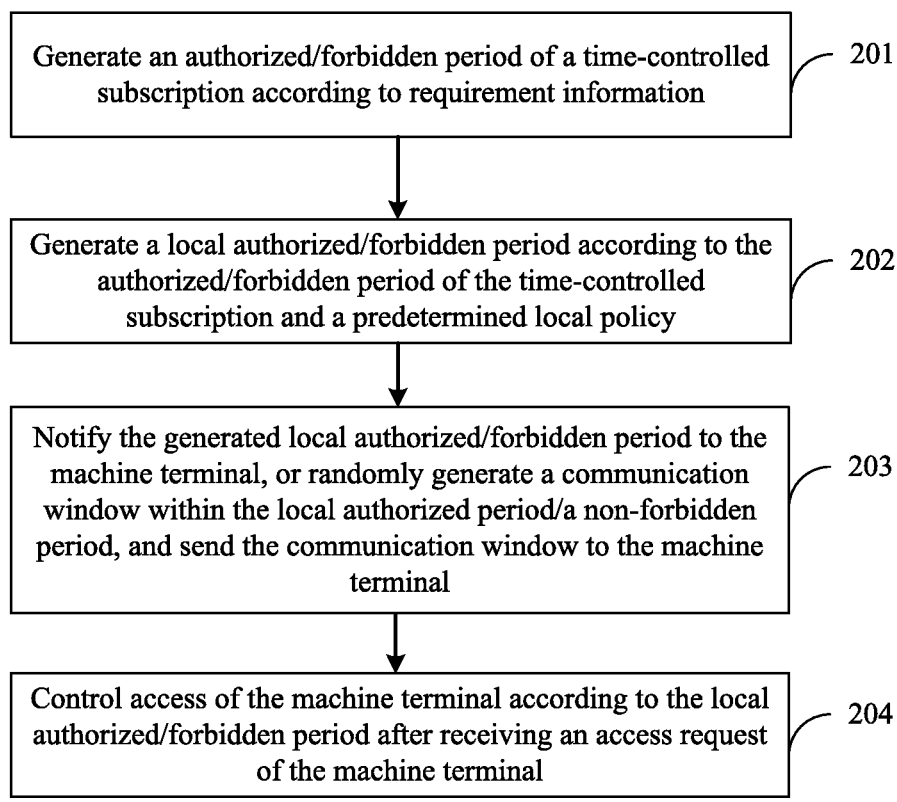
FIG. 2 is a flowchart of a control method according to a second embodiment of the present invention.

In addition to the method described in the first embodiment, in a second embodiment, a local authorized period and/or forbidden period may be generated locally, for example, on a SGSN (Serving GPRS Supporting Node) or MME (Mobile Management Entity) in network-side devices according to an authorized period and/or a forbidden period of a time-controlled subscription. Certainly, the local authorized period and/or forbidden period cannot conflict with a basic authorized period or non-forbidden period. In other words, the local authorized period and/or forbidden period needs to be within the basic authorized period or non-forbidden period. The basic authorized period and/or forbidden period refers to the authorized period and/or forbidden period generated according to the requirement information in step 101 in the first embodiment. As shown in FIG. 2, the specific procedure may being in step 201 by generating an authorized period and/or a forbidden period of a time-controlled subscription according to requirement information.

The requirement information may include network service load historical data and application information of the time-controlled subscription, where the time-controlled subscription refers to a subscription including a time-controlled feature. The application information of the time-controlled subscription may include information such as the quantity and service traffic of machine terminals of all time-controlled subscriptions, or information such as the quantity and service traffic of MTC application machine terminals of a certain type of time-controlled subscriptions. The requirement information may further include system maintenance time.

In step 202, a local authorized period and/or forbidden period is generated according to the authorized period and/or forbidden period of the time-controlled subscription and a predetermined local policy. The predetermined local policy may be set according to specific environment or application such as, for example, a time zone, or service load.

In step 203, the local authorized period and/or forbidden period is sent to the machine terminal. Alternatively, a communication window is randomly generated within the local authorized period and/or a non-forbidden period and the communication window is then sent to the machine terminal.

In step 204, access of the machine terminal is controlled according to the local authorized period and/or forbidden period or the communication window after receiving an access request of the machine terminal. For example, it is judged whether the current time falls within the local authorized period or falls beyond the local forbidden period, and if so, the access of the machine terminal is allowed. Otherwise, the access of the machine terminal is denied or the access of the machine terminal is allowed but a label is added for the current access so that subsequent predetermined processing is performed according to the label.

As seen from the above, this embodiment not only can achieve the beneficial effect of the first embodiment, but also can generate a local authorized period and/or forbidden period more suitable for local actual environment according to the basic authorized period and/or forbidden period and the local policy. The second embodiment can more flexibly control the network access of the machine terminal of the time-controlled subscription.

Figure 3A:
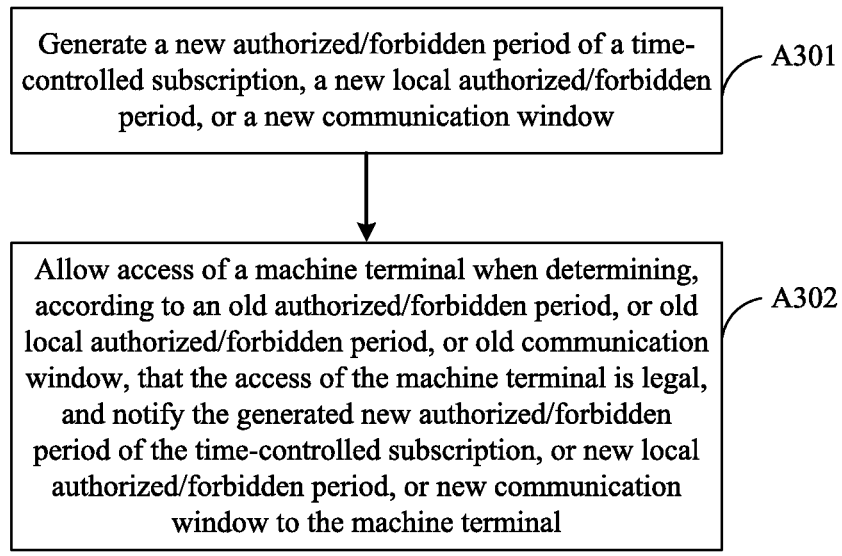
FIG. 3a is a flowchart of an update method according to a third embodiment of the present invention.

For the methods described in the first and second embodiments, furthermore, the authorized period and/or forbidden period may be updated. FIG. 3*a* shows a third embodiment. In step A301, a new authorized period and/or forbidden period, or a new local authorized period and/or forbidden period, or a new communication window is generated. In step A302, access of a machine terminal is allowed when determining, according to an old authorized period and/or forbidden period, or old local authorized period and/or forbidden period, or old communication window, that the access of the machine terminal is legal. The generated new authorized period and/or forbidden period, or new local authorized period and/or forbidden period, or new communication window is notified to the machine terminal.

After receiving the new authorized period and/or forbidden period, or new local authorized period and/or forbidden period, or new communication window, the machine terminal updates an authorized period and/or a forbidden period, or a local authorized period and/or forbidden period, or a communication window stored by itself (i.e., the machine terminal). The machine sends an access request to the network side according to the new authorized period and/or forbidden period, or new local authorized period and/or forbidden period, or new communication window when next communication is required.

Figure 3B:
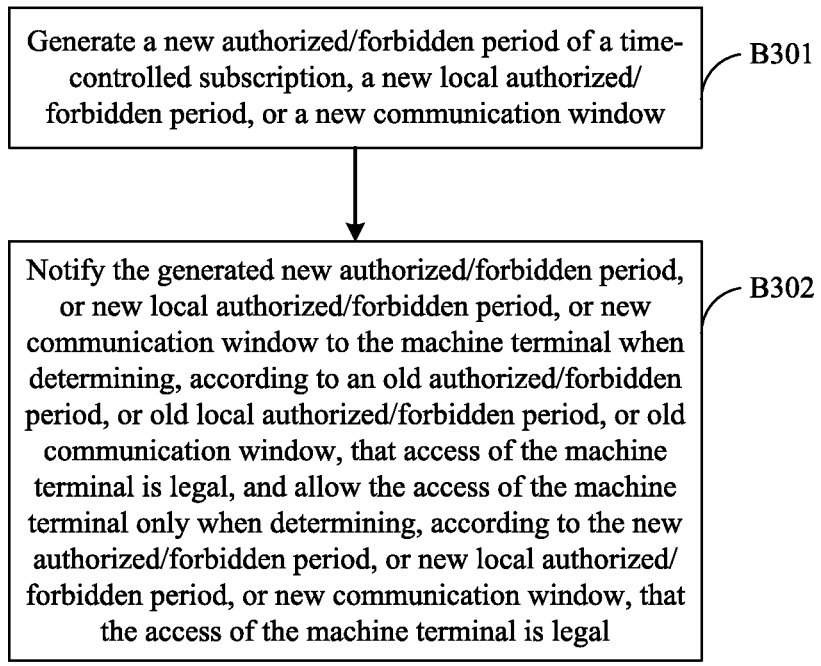
FIG. 3b is a flowchart of another update method according to the third embodiment of the present invention.

Alternatively, in step B301 in FIG. 3*b*, the procedure may include generating a new authorized period and/or forbidden period, or a new local authorized period and/or forbidden period, or a new communication window. Next, in step B302, the process notifies the generated new authorized period and/or forbidden period, or new local authorized period and/or forbidden period, or new communication window to the machine terminal when determining, according to an old authorized period and/or forbidden period, that access of the machine terminal is legal. Access of the machine terminal is allowed only when determining, according to the new authorized period and/or forbidden period, or new local authorized period and/or forbidden period, or new communication window, that the access of the machine terminal is legal.

For example, when a network-side device determines, according to the old authorized period and/or forbidden period, or old local authorized period and/or forbidden period, or old communication window, that the machine terminal has entered the old authorized period or non-forbidden period, or has entered the old local authorized period or non-forbidden period, or has entered the old communication window, the network-side device notifies the generated new authorized period and/or forbidden period, or new local authorized period and/or forbidden period, or new communication window to the machine terminal, and denies the access of the machine terminal.

After receiving the new authorized period and/or forbidden period, or new local authorized period and/or forbidden period, or new communication window, the machine terminal updates the authorized period and/or forbidden period, or local authorized period and/or forbidden period, or communication window stored by itself (i.e., the machine terminal). The process then sends an access request to the network-side device when the machine terminal has entered the new authorized period and/or non-forbidden period, or new local authorized period and/or non-forbidden period, or new communication window when the next communication is required.

As seen from the above, this embodiment not only can achieve the beneficial effect of the first embodiment and the second embodiment, but also can update the authorized period and/or forbidden period at any time as required to adapt to the actual requirement and improve the communication quality.

Figure 4:
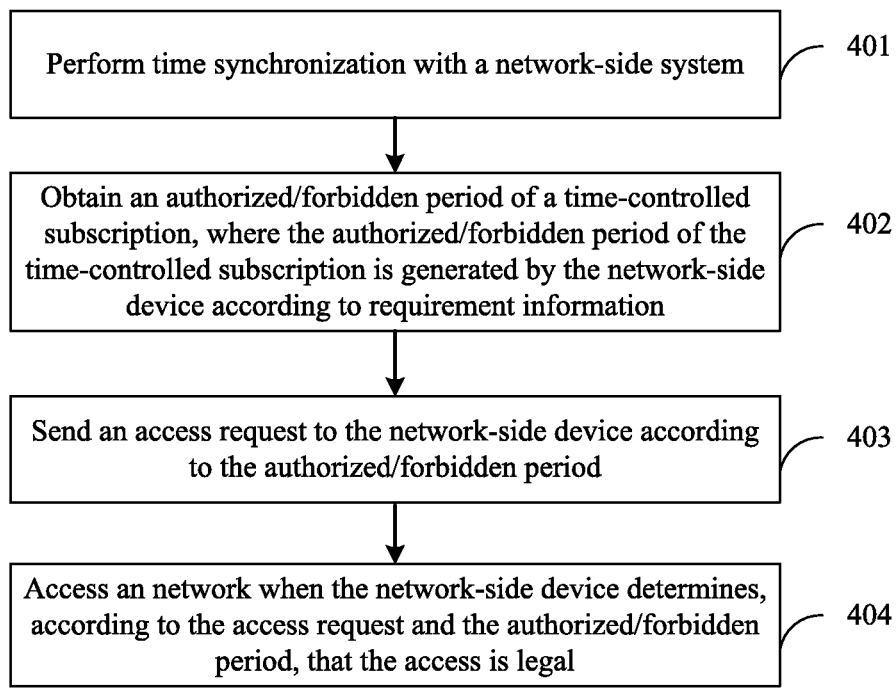
FIG. 4 is a flowchart of a control method according to a fourth embodiment of the present invention.

A fourth embodiment is described from the perspective of a machine terminal. The specific procedure of a method for controlling network access of a machine terminal, as shown in FIG. 4, may begin with step 401 by performing time synchronize with a network-side system (the network-side system includes at least a network-side device). Thus, the time synchronization is performed with the network-side device.

For example, the synchronization is implemented through the global positioning system (GPS). In other examples, the time synchronization is implemented by receiving the system time broadcast by a mobile network. For example, the network side may broadcast the system time with an authorized period and/or a forbidden period to the machine terminal. In still other examples, the time synchronization may be performed when the machine terminal communicates with an MTC server.

In step 402, the process obtains at least one parameter of an authorized period and/or a forbidden period of a time-controlled subscription, a local authorized period and/or forbidden period, or a communication window, where the communication window is randomly generated by the network-side device within the local authorized period and/or a non-forbidden period. The local authorized period and/or forbidden period is generated by the network-side device according to the authorized period and/or forbidden period of the time-controlled subscription and a predetermined local policy. The authorized period and/or forbidden period of the time-controlled subscription is generated by the network-side device according to requirement information.

The requirement information includes network service load historical data and application information of the time-controlled subscription, where the application information of the time-controlled subscription may include information such as the quantity and service traffic of machine terminals of all time-controlled subscriptions, or information such as the quantity and service traffic of MTC application machine terminals of a certain type of time-controlled subscriptions.

The requirement information may further include information about an authorized period and/or a forbidden period of an existing time-controlled subscription. In addition, the application information of the time-controlled subscription in the requirement information is specifically application information of a particular time-controlled subscription. For example, the application information is any combination of information such as an application type (e.g., an automatic vending machine, a meter reading, etc.), a preferential communication period, a communication frequency or cycle, average/maximum data amount, average/maximum communication duration, average/maximum data rate, quantity of machine terminals, and maintenance time of the MTC server.

In addition, the requirement information may further include system maintenance time and so on. The authorized period and/or forbidden period of the time-controlled subscription may be obtained by receiving the authorized period and/or forbidden period of the time-controlled subscription broadcast by the network-side device through a CBS, or by receiving the authorized period and/or forbidden period of the time-controlled subscription broadcast by the network-side device through a cell system parameter. Further, the authorized period and/or forbidden period of the time-controlled subscription may be obtained by sending a first access request to the network-side device and receiving the local authorized period and/or forbidden period or the authorized period and/or forbidden period of the time-controlled subscription returned by the network-side device according to the first access request. The local authorized period and/or forbidden period is generated by the network-side device according to the authorized period and/or forbidden period of the time-controlled subscription and the predetermined local policy. The "authorized period and/or forbidden period of the time-controlled subscription" may be authorized periods and/or forbidden periods of all time-controlled subscriptions, or authorized periods and/or forbidden periods of a certain type of time-controlled subscriptions, or an authorized period and/or a forbidden period of a particular time-controlled subscription.

The predetermined local policy may be set according to specific environment or application such as, for example, a time zone or service load. In addition, the first access request herein refers to a request message used to obtain an authorized period and/or a forbidden period or an ordinary access request message, and in the specific implementation, may be set according to protocol requirements corresponding to specific application environment. For example, the first access request may be specifically an Attach request or a service request. It should be noted that the first access request may further carry an indication for obtaining an authorized period and/or a forbidden period or used to indicate that the first access request is intended to obtain the authorized period and/or forbidden period.

In still other examples, the authorized period and/or forbidden period of the time-controlled subscription may be obtained by receiving the communication window sent by the network-side device. The communication window is randomly generated by the network-side device within the local authorized period and/or non-forbidden period.

In step 403, an access request is sent to the network-side device according to the authorized period and/or forbidden period of the time-controlled subscription, the local authorized period and/or forbidden period, or the communication window.

For example, when the machine terminal has communication need and the current time falls within the authorized period (or non-forbidden period), the machine terminal may execute a randomization operation for starting communication, that is, randomly select a certain time point within the authorized period to send the access request to the network-side device.

The access request refers to various request messages sent by the machine terminal for accessing the network. In the specific implementation, different request messages may be used according to protocol requirements of different networks. For example, an Attach request message, a location update request, or a service request in a GPRS network may be used, the details of which are disclosed in the prior art and are not repeatedly described herein.

In step 404, a network is accessed when the network-side device determines to allow the access according to the access request and at least one parameter of the authorized period and/or forbidden period of the time-controlled subscription, the local authorized period and/or forbidden period, or the communication window stored by the network-side device. In other words, the machine terminal accesses the network when the network-side device determines, according to the access request and authorized period and/or forbidden period of the time-controlled subscription, or access request and local authorized period and/or forbidden period, or access request and communication window, that the access is legal.

For example, the network-side device may judge, according to the access request and authorized period and/or forbidden period, whether the current time falls within the authorized period or falls beyond the forbidden period, and if so, allow the access of the machine terminal. Otherwise, if the current time falls beyond the authorized period or still falls within the forbidden period, the network-side device may deny the access of the machine terminal or allow the access of the machine terminal but add a label for the current access so that predetermined processing is performed according to the label.

Optionally, the machine terminal may further receive a prompt sent by the network-side device about why the access is denied. Further, after accessing the network, the machine terminal optionally communicates with the network-side device. For example, the machine terminal may communicate by initiating Packet Data Protocol (PDP) connection activation, and communicating with the network-side device. Alternatively, the machine terminal may use a default bearer to communicate with the network-side device or create a dedicated bearer (Bearer) and using the created bearer to communicate with network-side device. The communication methods mentioned above are disclosed in the prior art and are not repeatedly described herein.

In this embodiment, an authorized period and/or a forbidden period of a time-controlled subscription is obtained and then network access is performed according to the authorized period and/or forbidden period. The authorized period and/or forbidden period is generated by the network-side device according to information such as network service load historical data and application information of a time-controlled subscription. Because the network access time of a machine terminal can be controlled flexibly, communication of the machine terminal can be controlled flexibly, and impacts of machine terminal communication on ordinary terminal communication can be reduced. For example, the machine terminal is allowed to access a network during a service valley period of an operator network, which avoids possible network congestion, reduces impacts on the ordinary terminal communication, and also guarantees the communication quality of the machine terminal while ensuring the communication quality of an ordinary terminal.

According to the methods described in the above embodiments, the fifth, sixth, and seventh embodiments are described in detail with examples.

A fifth embodiment is described in detail by using a general packet radio service (GPRS) network as an example. It should be noted that this solution is also applicable to an evolved packet system (EPS).

Figure 5:
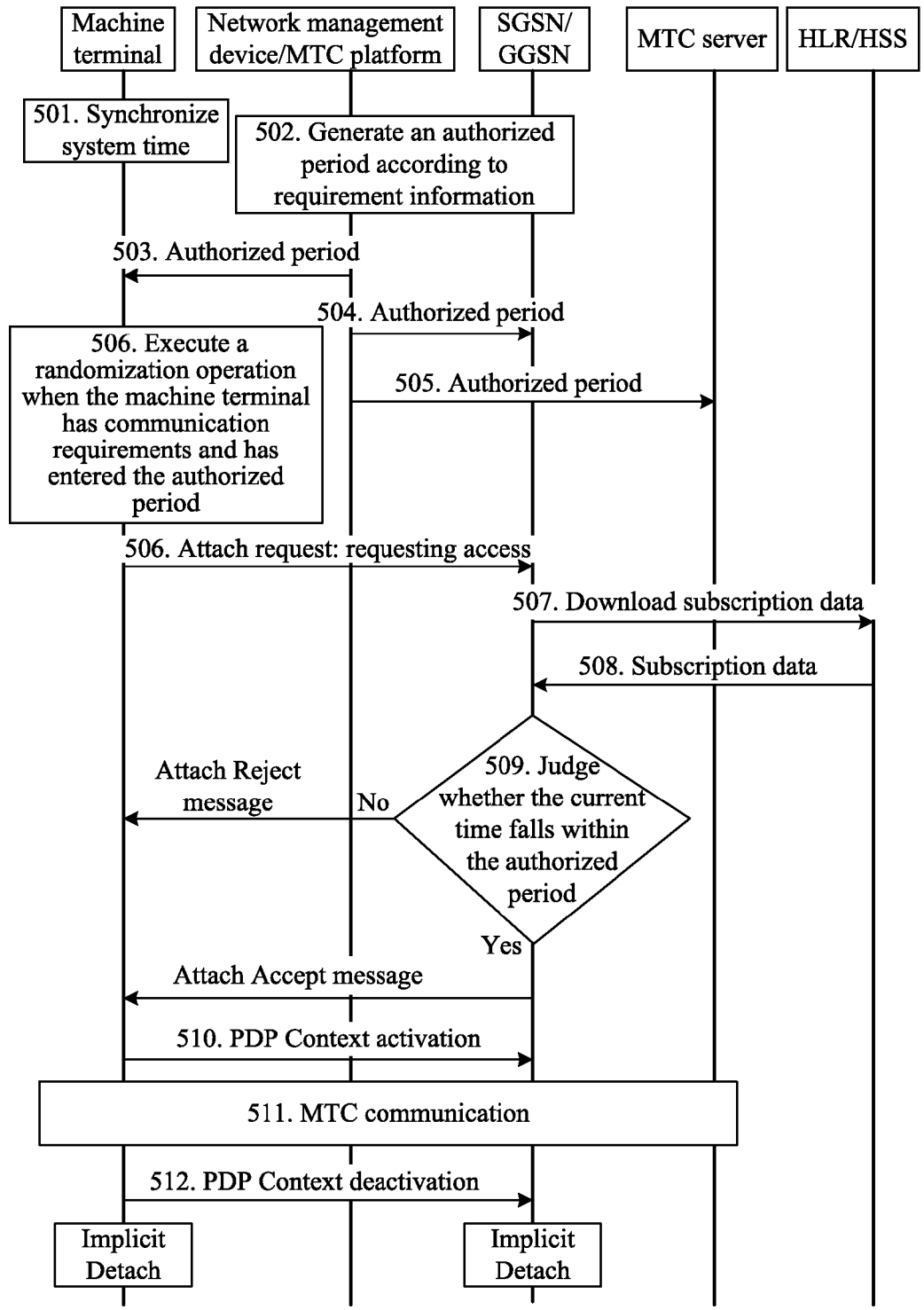
FIG. 5 is a signaling diagram of a control method according to a fifth embodiment of the present invention.

A network-side device includes a network management device, a serving GPRS support node (SGSN), a gateway GPRS support node (GGSN), an MTC server, and an HLR/HSS, and the network-side device may further include an MTC platform. In step 501 in FIG. 5, a machine terminal performs time synchronization with a network-side system.

For example, the synchronization is implemented through the GPS or the synchronization is implemented by receiving the system time broadcast by a mobile network. In this case, the network side may broadcast the system time with an authorized period to the machine terminal. Alternatively, the time synchronization may be performed when the machine terminal communicates with the MTC server.

In step 502, the network management device or MTC platform generates authorized periods of all time-controlled subscriptions or authorized periods of a certain type of time-controlled subscriptions according to requirement information, where authorized periods of any type of time-controlled subscriptions may be different or may be the same. The requirement information may include network service load historical data and application information of a time-controlled subscription, and may further include system maintenance time, where the application information of a time-controlled subscription may include information such as the quantity and service traffic of machine terminals of all time-controlled subscriptions, or information such as the quantity and service traffic of MTC application machine terminals of a certain type of time-controlled subscriptions.

The authorized period should be within in a service valley period of a network and satisfy the communication requirement of an MTC application. For example, if the service valley period of the network is 3:00-4:00 a.m., the authorized periods of all time-controlled subscriptions may be set to 3:00-4:00 a.m. In this case, machine terminals of all time-controlled subscriptions may be allowed to access the network within the period of 3:00-4:00 a.m. every day to perform data communication.

In another example, if an operator divides the time-controlled subscriptions into three types, A, B, and C, authorized periods of the three types A, B, and C of time-controlled subscriptions may be set to 3:00-3:20, 3:20-3:40, and 3:40-4:00 a.m., respectively. In this case, machine terminals of each type of the time-controlled subscriptions access the network to perform data communication according to respective authorized periods thereof. In other words, the machine terminals of type A of the time-controlled subscriptions may access the network at 3:00-3:20 a.m. to perform data communication. The machine terminals of type B of the time-controlled subscriptions may access the network at 3:20-3:40 a.m. to perform data communication. The machine terminals of type C of the time-controlled subscriptions may access the network at 3:40-4:00 a.m. to perform data communication.

As used herein the network management device refers to a back-end operation support system providing telecom services and its function may include network element management of the telecom network, resource management and scheduling, service provisioning, service management, quality of service guarantee, and so on. Therefore, in the specific implementation, the control of network access of the machine terminal may be included into the resource management and resource scheduling functions of the network management device.

The MTC platform may also be referred to as an MTC gateway. The MTC platform supports interworking between a public land mobile network (PLMN) and the MTC server, provides management functions such as data routing, monitoring, user authentication, and accounting, and provides standardized interfaces for the MTC server so that MTC communication is simple and direct. Therefore, in the specific implementation, the control of the network access of the machine terminal may also be included into the management functions of the MTC platform.

It should be noted that the network management device or MTC platform may regenerate an authorized period under the trigger of a preset condition, where the preset condition may be set as required. For example, the network deploys a certain quantity of machine terminals of the time-controlled subscription again, or the system maintenance time changes. In this case, the network management device or MTC platform is triggered to regenerate an authorized period. Certainly, the generated authorized periods may be directly allocated to the newly deployed machine terminal of the time-controlled subscription.

In step 503, the network management device or MTC platform notifies the generated authorized period to the machine terminal. For example, the authorized period may be notified to the machine terminal by using a variety of modes. As an example, the authorized period may be broadcast to the machine terminal through a CBS, that is, using a CBS broadcast message to notify the authorized period to the machine terminal. It should be noted that, in order to indicate that the CBS broadcast message is used for the time-controlled subscription application, a particular message identifier may be set in the CBS broadcast message to distinguish the application from applications supported by other CBS broadcast messages, and certainly, a message identifier may be respectively allocated to each type of the time-controlled subscriptions.

Alternatively, the authorized period may be broadcast to the machine terminal by a cell system parameter. Further, the authorized period may be broadcast using other broadcast or multicast modes and unicast mode. For example, the generated authorized period can be written to subscription data of the HLR/HSS and then the authorized period can be delivered to the machine terminal through the SGSN in the attach procedure, location update procedure, or service request procedure of the machine terminal. This mode is not repeatedly described herein.

In step 504, the network management device or MTC platform may notify the authorized period to all related SGSNs, or only to some SGSNs accessed by machine terminals of the time-controlled subscription, so that the SGSNs may subsequently control network access of the machine terminals of the time-controlled subscription based on the authorized period, allow the machine terminals to access the network within the authorized period, and reject access requests of the machine terminals beyond the authorized period, or, allow the access requests of the machine terminals beyond the authorized period but add a label for the current access so as to perform predetermined processing. For example, special charging may be performed for the labeled machine terminals.

It should be noted that the network management device or MTC platform may also not directly notify the authorized period to the SGSN, but write the generated authorized period and/or forbidden period into the subscription data (or known as user data) of the HLR/HSS. Then, after receiving the access request of the machine terminal, the SGSN obtains corresponding subscription data from the HLR/HSS and performs processing. For example, the SGSN controls network access of the machine terminal according to the authorized period in the subscription data, or generates a local authorized period according to the authorized period in the subscription data. The SGSN then controls the network access of the machine terminal according to the local authorized period which is described in the sixth embodiment and not repeatedly described herein.

Optionally, in step 505, the network management device or MTC platform may notify the authorized period to a related MTC server so that the MTC server may determine the occasion for performing communication with the machine terminal. In step 506, when the machine terminal has communication need and the current time falls within the authorized period, the machine terminal executes a randomization operation. In other words, the machine randomly selects a certain time point within the authorized period to access the network, and the randomization operation should ensure completion of the machine terminal communication before the authorized period expires.

For example, the machine terminal uses a uniform random function to generate number a between 0 and 1, and in this case, time t is selected for the network access, where t=start time of the authorized period+a*length of the authorized period.

It should also be noted that in order for the machine terminal to complete the communication before the authorized period expires, it should be ensured that "(1−a)*length of the authorized period" is greater than the communication time required by the machine terminal. Therefore, if the generated numeral cannot satisfy the requirement, a random number a needs to be regenerated.

It should be noted that when the machine terminal has communication requirement but the current time falls beyond the authorized period, the machine terminal may also initiate a network access request, for example, an Attach request, a location update request, or a service request.

In step 507, the machine terminal initiates an Attach request to the SGSN to request the network access. The SGSN downloads subscription data (or known as user data) from the HLR/HSS in step 508. The subscription data includes time-controlled information such as, for example, a flag bit of a time-controlled feature, the type of the time-controlled application.

In step 509, if the subscription data indicates that the terminal is a machine terminal of the time-controlled subscription, the SGSN/GGSN judges whether the current time falls within the authorized period notified by the network management device or MTC platform, and if not, returns an Attach Reject message, indicating that the network access of the machine terminal fails, and ends the procedure. Otherwise, the SGSN/GGSN returns an Attach Accept message, and step 510 is executed.

In step 510, the machine terminal initiates PDP Context activation, and the SGSN instructs the GGSN to create a PDP Context and instructs a radio access network (RAN) to create a radio access bearer (RAB). The machine terminal and the MTC server perform the MTC communication in step 511. Optionally, in step 512, after the communication is complete, the machine terminal initiates PDP Context deactivation, and the SGSN instructs the GGSN to delete the PDP context. Further, if the machine terminal has no communication requirement for a rather long time later, the machine terminal may execute implicit detach/implicit detach (Implicit Detach) and the SGSN may also execute the implicit Detach under the trigger of the time-controlled information.

In addition to the communication method described in the above steps 510-511, the machine terminal may also use a default bearer to communicate with the MTC server, or create a dedicated bearer to communicate with the MTC server. As seen from the above, in this embodiment, authorized periods of all time-controlled subscriptions or authorized periods of a certain type of time-controlled subscriptions are generated according to information such as network service load historical data, system maintenance time, and application information of the time-controlled subscription, and then network access of the machine terminal is controlled according to the authorized periods.

Because the network access time of the machine terminal can be controlled flexibly, communication of the machine terminal can be controlled flexibly, and impacts of machine terminal communication on ordinary terminal communication can be reduced. For example, preferably, the machine terminal is allowed to access a network during a service valley period of an operator network, which avoids possible network congestion, reduces impacts on the ordinary terminal communication, and also guarantees the communication quality of the machine terminal while ensuring the communication quality of the ordinary terminal.

In the fifth embodiment, the network management device or MTC platform generates authorized periods and/or forbidden periods of all time-controlled subscriptions, or authorized periods and/or forbidden periods of a certain type of time-controlled subscriptions. A sixth embodiment is described by using an example in which the network management device or MTC platform generates an authorized period and/or a forbidden period of a particular time-controlled subscription, that is, authorized periods of any one of time-controlled subscriptions may be different or may be the same.

Same as the fifth embodiment, this embodiment is also described in detail by using a GPRS network as an example. It should be noted that this solution is also applicable to an EPS.

Figure 6:
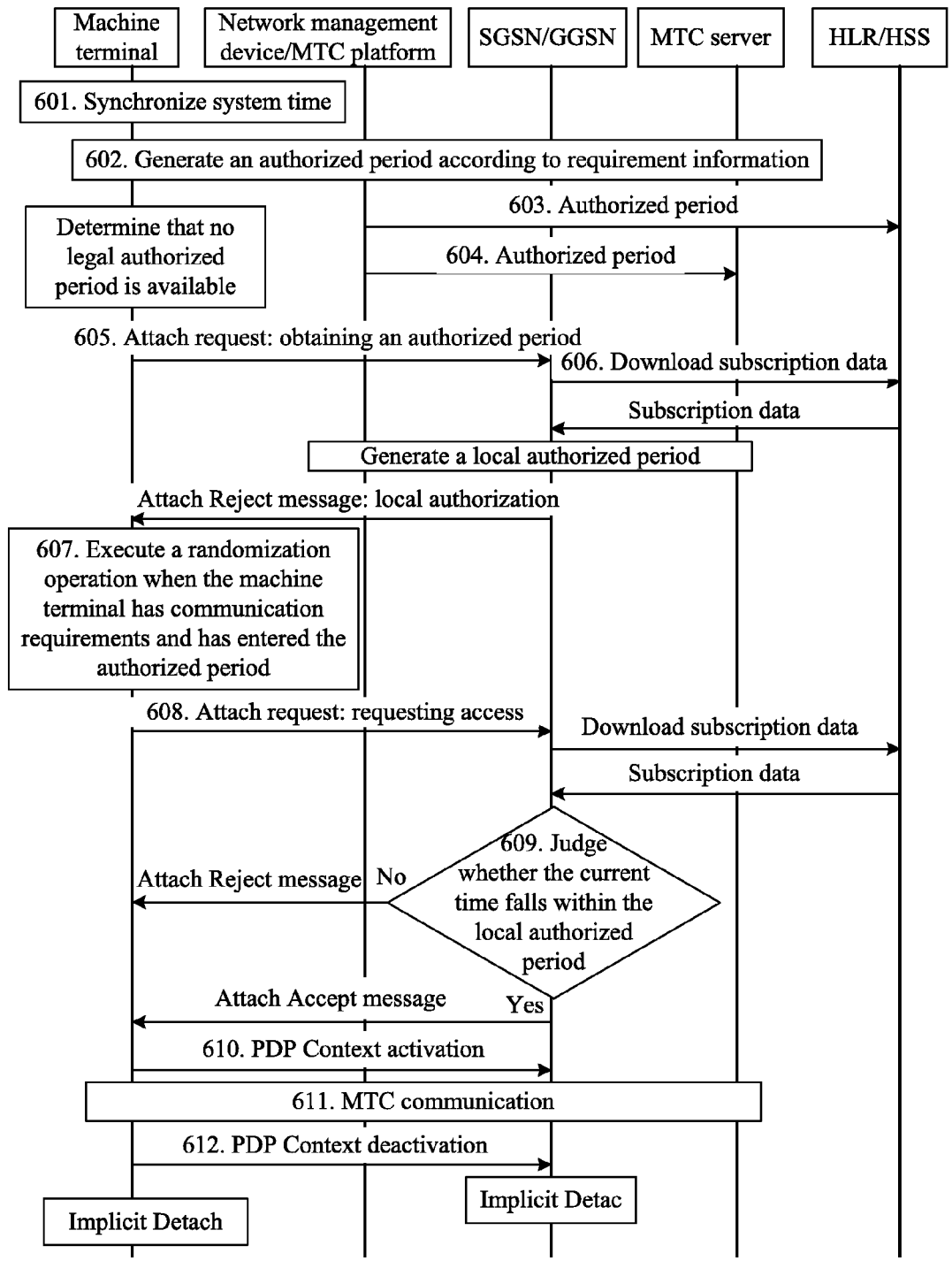
FIG. 6 is a signaling diagram of a control method according to a sixth embodiment of the present invention.

A network-side device includes a network management device, an SGSN, a GGSN, an MTC server, and an HLR/HSS. The network-side device may further include an MTC platform. As shown in FIG. 6, the specific procedure may be as follows:

In step 601, a machine terminal performs time synchronization with a network-side system. For example, the synchronization is implemented through the GPS or the synchronization is implemented by receiving the system time broadcast by a mobile network. Alternatively, the time synchronization may also be performed when the machine terminal and the MTC server communicate.

The network management device or MTC platform generates an authorized period of a particular time-controlled subscription according to requirement information in step 602. For example, one or more periods in a day or a week or a month may be generated. Further, the network management device of MTC platform may generate other time-controlled information such as a forbidden period and communication duration.

The requirement information may include network service load historical data and application information of the particular time-controlled subscription. The requirement information may further include system maintenance time and/or information about an authorized period of an existing time-controlled subscription. The application information of the particular time-controlled subscription may be, specifically, information such as an application type (e.g., an automatic vending machine, a meter reading, etc.), a preferential communication period, a communication frequency or cycle, average/maximum data amount, average/maximum communication duration, average/maximum data rate, quantity of machine terminals, and/or maintenance time of the MTC server. The authorized period should be within in a service valley period and satisfy the communication requirement of an MTC application.

In step 603, the network management device or MTC platform writes the generated authorized period into subscription data of the HLR/HSS. If other time-controlled information is also generated in step 602 such as, for example, the forbidden period and communication duration, the other information is also written into the subscription data of the HLR/HSS. Optionally, the network management device or MTC platform may further notify the generated authorized period to the SGSN, which is described in the fifth embodiment and is not repeatedly described herein.

In step 604, the network management device or MTC platform notifies the time-controlled information such as the generated authorized period to a related MTC server so that the MTC server determines the occasion for performing communication with the machine terminal. When the machine terminal determines that it has no legal authorized period or is triggered, for example, by the field operation of a maintenance engineer, the machine terminal sends an Attach request to the SGSN to obtain the authorized period in step 605.

Specifically, any one of the following modes may be used. In one example, the Attach request may carry an extended Attach type used to indicate that the Attach request is intended to obtain the authorized period.

The extension of the Attach type is shown in Table 1:

TABLE 1

| Type of attach (octet 1, bit 1 to 3) | | | |
|---|---|---|---|
| Bits | | | |
| 3 | 2 | 1 | |
| 0 | 0 | 1 | GPRS attach |
| 0 | 1 | 0 | Not used. This value was allocated in earlier versions of the protocol. The code point "010" if received by the network, it shall be interpreted as "Combined GPRS/IMSI attach". |
| 0 | 1 | 1 | Combined GPRS/IMSI attach |
| 1 | 0 | 0 | Emergency attach |
| 1 | 0 | 1 | Attach for Access Grant |
| . . . | | | |

In the prior art, generally three bits may be used to identify the type of attach, for example, '001' indicates GPRS attach, '010' indicates not used, '011' indicates combined GPRS/international mobile subscriber identification number (IMSI) attach, and '100' indicates emergency call attach. '101' is extended by the embodiment of the present invention and indicates that the current attachment is intended to obtain the authorized period.

It should be noted that the authorized period may be an authorized period of a time-controlled subscription (i.e., a basic authorized period in the foregoing embodiment), or may be a local authorized period, or may be a communication window. Specifically, the authorized period may be set according to a policy of an operator.

In another example, the Attach type is not extended. In this case, the Attach type in the prior art, for example, "GPRS attach", is used. Optionally, the machine terminal may also use other extension information to instruct the network to obtain the authorized period.

In step 606, if the SGSN has no subscription data of the machine terminal locally, the SGSN obtains the subscription data from the HLR/HSS. The subscription data includes the information about the authorized period.

If the Attach request of the machine terminal explicitly indicates that the authorized period (for example, using the first mode in step 605) will be obtained, to simplify the operation, the SGSN may not judge whether the current time falls within the authorized period, but directly send an authorized period to the machine terminal through an Attach Reject. Certainly, in this case, the SGSN may also judge whether the current time falls within the authorized period. If the current time falls within the authorized period, the SGSN may accept the Attach request, return an Attach Accept to the machine terminal, and carry the authorized period in the Attach Accept response.

If the Attach request does not explicitly indicate that the authorized period will be obtained, when the SGSN learns that the terminal is a machine terminal of the time-controlled subscription according to the subscription data, the SGSN delivers an authorized period to the machine terminal through an Attach Reject or an Attach Accept. An existing Attach Reject response may be extended to carry extension information of the authorized period. The extension information is shown in Table 2:

TABLE 2

| Information Element (Information Element) | Presence (Presence) |
|---|---|
| Protocol discriminator (protocol discriminator) | M (mandatory) |
| Skip indicator (skip indicator) | M (mandatory) |
| Attach reject message identity (attach reject message identity) | M (mandatory) |
| GMM cause (GPRS mobility management cause) | M (mandatory) |
| Access Grant time interval (authorized period) | O (optional) |
| T3302 value (T3302 value) | O (optional) |

Likewise, an existing Attach Accept response may also be extended to carry the extension information of the authorized period.

TABLE 3

| Information Element (Information Element) | Presence (Presence) |
|---|---|
| Protocol discriminator (protocol discriminator) | M (mandatory) |
| Skip indicator (skip indicator) | M (mandatory) |
| Attach accept message identity (attach accept message identity) | M (mandatory) |
| Attach result (attach result) | M (mandatory) |
| ... | ... |
| Access Grant time interval (authorized period) | O (optional) |

"Access Grant time interval" in Table 2 and Table 3 is extended by the embodiment of the present invention and indicates an authorized period. In addition, in Table 2, the value of the GMM cause also needs to be set to an extended value to indicate that a rejection cause is that "the machine terminal obtains an authorized period."

Because actual network environment such as time zone or service load in different network areas (e.g., the network of Urumchi city and the network of Beijing city) is different, to better adapt to the actual network environment, optionally, the SGSN may also generate a local authorized period according to the authorized period and forbidden period in the subscription data and the local policy of the SGSN. In this instance, the local authorized period should not overlap the forbidden period. Specifically, one or more forbidden periods may exist, for example, to keep away from the maintenance time of the HLR/HSS or the maintenance time of the MTC server (which may be different). A corresponding forbidden period may be set.

The local policy may be set according to the specific environment or MTC application such as, for example, time zone or service load historical data. The machine terminal stores the received authorized period. For example, the machine terminal stores the authorized period in the received subscription data or the local authorized period generated by the SGSN. In this way, the machine terminal may properly configure its operation according to the information of the authorized period and initiate network access at the appropriate time. It should be noted that to save signaling overheads, if an extended indication for obtaining an authorized period is included when the SGSN obtains the subscription data from the HLR/HSS, the HLR/HSS may not need to send complete subscription data to the SGSN but only send content such as the authorized period and the forbidden period.

In step 607, when the machine terminal has communication need and the current time falls within the authorized period, the machine terminal executes a randomization operation. In other words, the machine terminal randomly selects a certain time point within the authorized period to access the network and the randomization operation should ensure completion of the machine terminal communication before the authorized period expires. For example, the machine terminal uses a uniform random function to generate a number between 0 and 1, and in this case, time t is selected for the network access, where t=start time of the authorized period+a*length of the authorized period.

In order for the machine terminal to complete communication before the authorized period expires, it should be ensured that "(1−a)*length of the authorized period" is greater than the communication time required by the machine terminal. Therefore, if the generated numeral cannot satisfy the requirement, a random number "a" needs to be regenerated.

The machine terminal initiates an Attach request to the SGSN to request the network access in step 608. The Attach type may be GPRS attach or combined GPRS/IMSI attach, and so on.

In step 609, if the SGSN stores the subscription data of the machine terminal (e.g., storing the obtained subscription data in step 606), the SGSN judges whether the current time falls within the authorized period in the subscription data, and if not, returns an Attach Reject indicating that the network access of the machine terminal fails. Alternatively, the SGSN allows the access request of the machine terminal beyond the authorized period but adds a label for the current access so as to perform predetermined processing. For example, predetermined processing may include performing special charging for the labeled machine terminal. Otherwise the SGSN returns an Attach Accept and continues to execute step 610. If the SGSN does not store the subscription data of the machine terminal, the subscription data needs to be obtained from the HLR/HSS and then the above judging operation is executed.

It should be noted that, in step 606, if the SGSN generates a local authorized period and notifies the local authorized period to the machine terminal, the SGSN should judge whether the current time falls within the local authorized period instead of the authorized period in the subscription data. If the SGSN stores the subscription data of the machine terminal and the local authorized period, the SGSN judges whether the current time falls within the local authorized period, and if not, returns an Attach Reject indicating that the network access of the machine terminal fails, or allows the access request of the machine terminal beyond the authorized period but adds a label for the current access so as to perform predetermined processing. Otherwise, the SGSN returns an Attach Accept and continues to execute step 610.

If the SGSN does not store the subscription data of the machine terminal, the SGSN obtains the subscription data from the HLR/HSS, generates a local authorized period based on the information of the authorized period and forbidden period in the subscription data and the local policy of the SGSN, and then judges whether the current time falls within the local authorized period. If the current time does not fall within the local authorized period, the SGSN returns an Attach Reject indicating that the network access of the machine terminal fails or allows the access request of the machine terminal beyond the authorized period but adds a label for the current access so as to perform predetermined processing. Otherwise, the SGSN returns an Attach Accept and continues to execute step 610.

In step 610, the machine terminal initiates PDP Context activation and the SGSN instructs the GGSN to create a PDP Context. The SGSN also instructs a RAN to establish a radio access bearer RAB. The machine terminal and the MTC server perform MTC communication in step 611.

Optionally, in step 612, after the communication is complete, the machine terminal initiates PDP Context deactivation and the SGSN instructs the GGSN to delete the PDP context. If the machine terminal has no communication requirement for a rather long time later, the machine terminal may execute implicit detach/implicit detach and the SGSN may also execute the implicit detach under the trigger of the time-controlled information. In addition to the communication method described in the above steps 610-611, the machine terminal may also use a default bearer to communicate with the MTC server or create a dedicated bearer to communicate with the MTC server.

In this embodiment, an authorized period of a particular time-controlled subscription is generated according to information such as network service load historical data, system maintenance time, and application information of the time-controlled subscription. Because the application information of the particular time-controlled subscription includes more detailed information, such as, an application type, a preferential communication period, a communication frequency or cycle, average/maximum data amount, average/maximum communication duration, average/maximum data rate, quantity of machine terminals, and/or maintenance time of the MTC server, more precise control of network access may be implemented. Furthermore, the SGSN may also generate a local authorized period more suitable for the actual network environment according to the (basic) authorized period and/or forbidden period in the subscription data and the local policy of the SGSN. The SGSN can more flexibly control network access of the machine terminal of a particular time-controlled subscription.

On the basis of the fifth and sixth embodiments, the generated authorized period of the time-controlled subscription may also be updated. A seventh embodiment is provided with a network-side device that includes a network management device, an SGSN, a GGSN, an MTC server, and an HLR/HSS. The network-side device may include an MTC platform.

Figure 7:
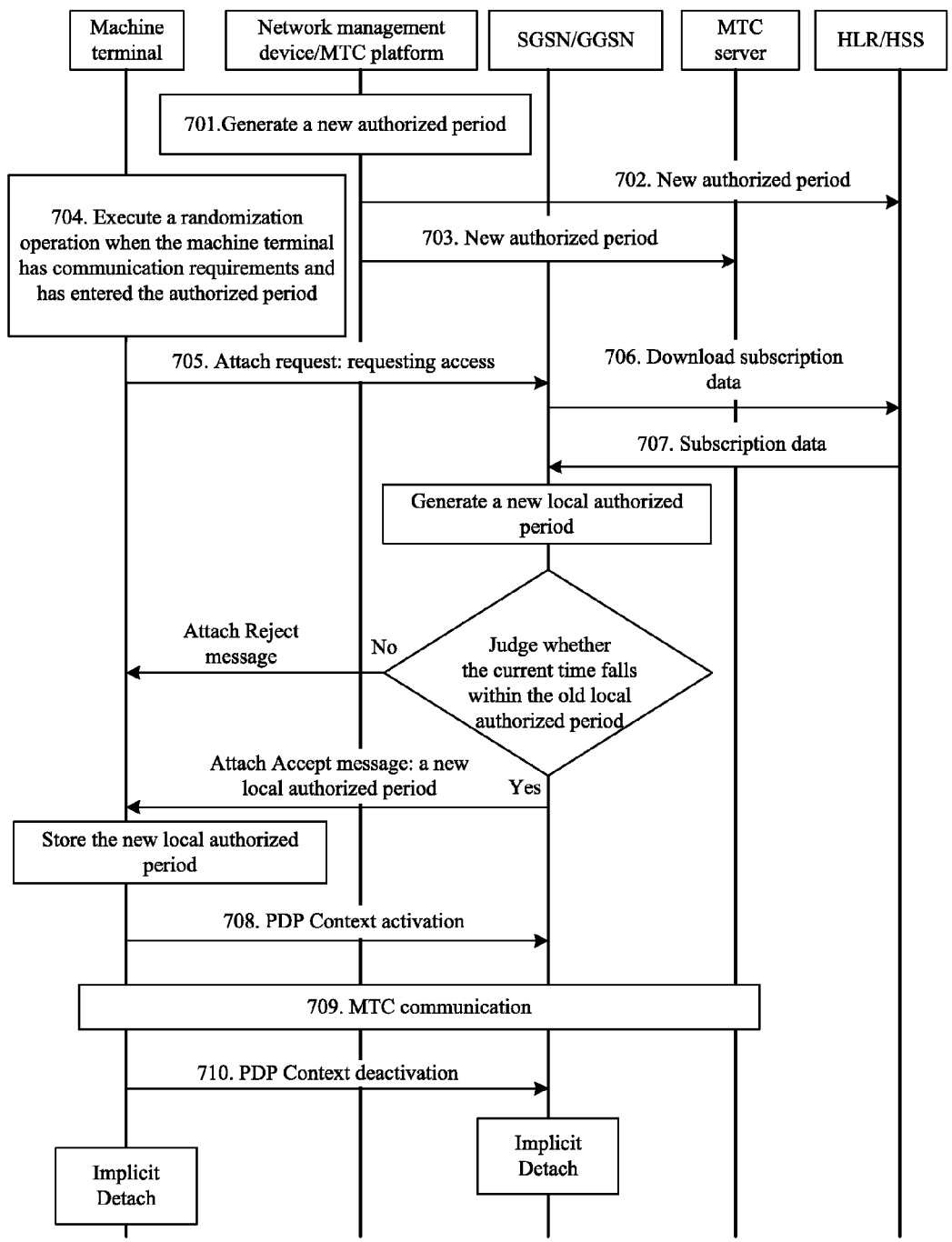
FIG. 7 is a signaling diagram of a control method according to a seventh embodiment of the present invention.

As shown in FIG. 7, the specific procedure may begin with the network management device or MTC platform regenerating an authorized period of a time-controlled subscription in step 701. The network management device or MTC platform obtains a new authorized period and may regenerate other time-controlled information such as a forbidden period or communication duration. The specific generation is the same as the fifth and sixth embodiments and is not repeatedly described herein.

In step 702, the network management device or MTC platform writes the generated new authorized period into subscription data of the HLR/HSS. If other time-controlled information is also generated in step 701 such as, for example, the forbidden period and communication duration, the other information is also written into the subscription data of the HLR/HSS. Optionally, the new generated authorized period may also be notified to the SGSN.

In step 703, the network management device or MTC platform notifies the new generated authorized period to a related MTC server so that the MTC server determines the occasion for performing communication with the machine terminal. Certainly, if other time-controlled information is also generated in step 701 such as, for example, the forbidden period and communication duration, the other information is also notified to the related MTC server.

When the machine terminal has communication need and the current time falls within an old authorized period, the machine terminal executes a randomization operation in step 704. In this case, the machine terminal randomly selects a certain time point within the old authorized period to access a network.

In step 705, the machine terminal initiates an Attach request to the SGSN where an Attach type indicates GPRS Attach so as to request the network access. The SGSN obtains the subscription data from the HLR/HSS in step 706. In step 707, the HLR/HSS sends the subscription data to the SGSN. The subscription data may include the old authorized period and the new authorized period. Certainly, if the SGSN further stores the old authorized period, the HLR/HSS may send only the new authorized period. The SGSN then judges, according to the old authorized period, whether the machine terminal has entered the old authorized period currently, and if not, the SGSN returns an Attach Reject. Otherwise, the SGSN sends an Attach Accept to the machine terminal. The Attach Reject or Attach Accept sent by the SGSN to the machine terminal carries the new authorized period.

If the access of the machine terminal is controlled by the local authorized period previously, the SGSN may generate a new local authorized period according to the new authorized period in the subscription data and a predetermined local policy, and judge, according to the old local authorized period, whether the machine terminal has entered the local authorized period currently. If not, the SGSN returns an Attach Reject, and if so, the SGSN sends a new local authorized period to the machine terminal while accepting the access of the machine terminal.

The machine terminal stores the new authorized period or new local authorized period after receiving the new authorized period or new local authorized period. Next, the machine terminal replaces the time-controlled subscription information, such as the old local authorized period, so that the new information is used in next communication.

Alternatively, the SGSN may also judge, directly according to the new authorized period, whether the machine terminal has entered the new authorized period currently, and if not, return an Attach Reject. In this case, the Attach Reject carries the new authorized period. If the machine terminal has entered the new authorized period currently, the SGSN allows the machine terminal to access the network and returns an Attach Accept. The Attach Reject or Attach Accept sent by the SGSN to the machine terminal carries the new authorized period.

Steps 708-710 are the same as steps 610-612, and are not repeatedly described herein. Optionally, if the machine terminal has no communication requirement for a rather long time later, the machine terminal may execute implicit detach and the SGSN may also execute the implicit detach under the trigger of the time-controlled subscription information. This embodiment not only can achieve the beneficial effect of the sixth embodiment, but also can update the authorized period and/or forbidden period at any time as required to adapt to the actual requirement and improve the communication quality.

In addition, it should be noted that in the fifth, sixth, and seventh embodiments, if the subscription data includes communication duration, the SGSN may further randomly generate a communication window within the authorized period or local authorized period based on the local policy. Further, the SGSN may send the communication window to the machine terminal without the need to send the authorized period to the machine terminal. In this case, the machine terminal does not need to execute the randomization operation, but only needs to initiate the network access at the beginning of the communication window. It should be noted that the network executes the randomization operation in place of the randomization operation of the machine terminal to enhance the control force of an operator. Furthermore, there are many types of access requests of the machine terminal. In addition to the Attach requests exemplified in the fifth, sixth, and seventh embodiments, the access request may also be a location update request or a service request, which is not repeatedly described herein.

Figure 8A:
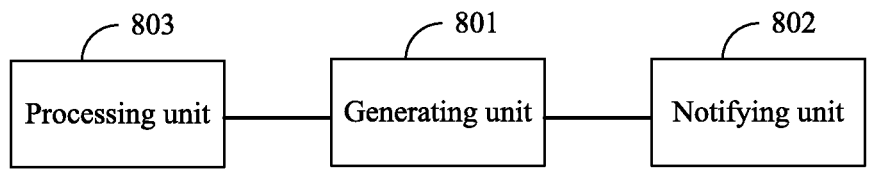
FIG. 8a is a schematic structural diagram of a network-side device according to an embodiment of the present invention.

To better implement the above method, an eighth embodiment of the present invention further provides a network-side device. As shown in FIG. 8*a*, the network-side device includes a generating unit 801, a notifying unit 802, and a processing unit 803.

The generating unit 801 is configured to generate an authorized period and/or a forbidden period of a time-controlled subscription according to requirement information. The requirement information may include network service load historical data and application information of the time-controlled subscription.

The application information of the time-controlled subscription may include information such as the quantity and service traffic of machine terminals of all time-controlled subscriptions, or information such as the quantity and service traffic of MTC application machine terminals of a certain type of time-controlled subscriptions. The requirement information may further include system maintenance time and other information.

The notifying unit 802 is configured to notify the authorized period and/or the forbidden period generated by the generating unit 801 to a machine terminal. The processing unit 803 is configured to control access of the machine terminal according to the authorized period and/or the forbidden period generated by the generating unit 801 after receiving an access request of the machine terminal.

For example, after receiving the access request of the machine terminal, the processing unit 803 allows the access of the machine terminal if the access is determined as legal according to the authorized period and/or forbidden period generated by the generating unit 801. Otherwise, if the access is illegal, the processing unit 803 denies the access of the machine terminal.

As used herein, the access request refers to various request messages sent by the machine terminal for accessing a network. In the specific implementation, different request messages may be used according to protocol requirements of different networks. For example, an Attach request message in a GPRS network may be used, the details of which are disclosed in the prior art and are not repeatedly described herein.

The generating unit 801 may include at least any one of a first generating subunit, a second generating subunit, and a third generating subunit. The first generating subunit is configured to generate authorized periods and/or forbidden periods of all time-controlled subscriptions according to the requirement information. The second generating subunit is configured to generate authorized periods and/or forbidden periods of a certain type of time-controlled subscriptions according to the requirement information.

For example, the authorized period is defined as 3:20-4:00 a.m. every day. In this case, during 3:20-4:00 a.m. every day, machine terminals of all time-controlled subscriptions or a certain type of time-controlled subscriptions may communicate through a mobile network, while communication through the mobile network beyond this period is forbidden.

As another example, the forbidden period is defined as 9:00-22:00 every day. In this case, during 9:00-22:00 every day, machine terminals of all time-controlled subscriptions or a certain type of time-controlled subscriptions are forbidden to communicate through the mobile network, while communication through the mobile network beyond this period (i.e., 22:00-9:00 next day) is allowed.

Machine terminals of authorized periods and/or forbidden periods of all time-controlled subscriptions or a certain type of time-controlled subscriptions may be uniformly controlled as described above. In addition, a machine terminal of a particular time-controlled subscription may be controlled. The third generating subunit is configured to generate an authorized period and/or a forbidden period of a certain time-controlled subscription according to the requirement information.

For example, an authorized period and/or a forbidden period may be generated for an automatic beverage-vending application device of seller A according to the requirement information. As another example, an authorized period and/or a forbidden period may be generated for an automatic newspaper-vending application device of seller B according to the requirement information.

In this case, the requirement information may further include information about an authorized period and/or a forbidden period of an existing time-controlled subscription. In addition, the application information of the time-controlled subscription in the requirement information is, specifically, application information of a particular time-controlled subscription. This application information may be an application type (e.g., an automatic vending machine, a meter reading, etc.), a preferential communication period, communication frequency or cycle, average/maximum data amount, average/maximum communication duration, average/maximum data rate, quantity of machine terminals, and/or maintenance time of the MTC server.

The notifying unit 802 includes at least any one of a first notifying subunit, a second notifying subunit, and a third notifying subunit. The first notifying subunit is configured to broadcast the authorized period and/or the forbidden period generated by the generating unit to the machine terminal through a CBS. The second notifying subunit is configured to broadcast the authorized period and/or the forbidden period generated by the generating unit to the machine terminal through a cell system parameter. The third notifying subunit is configured to receive a first access request sent by the machine terminal, and send, according to the first access request, the authorized period and/or forbidden period generated by the generating unit to the machine terminal.

Figure 8B:
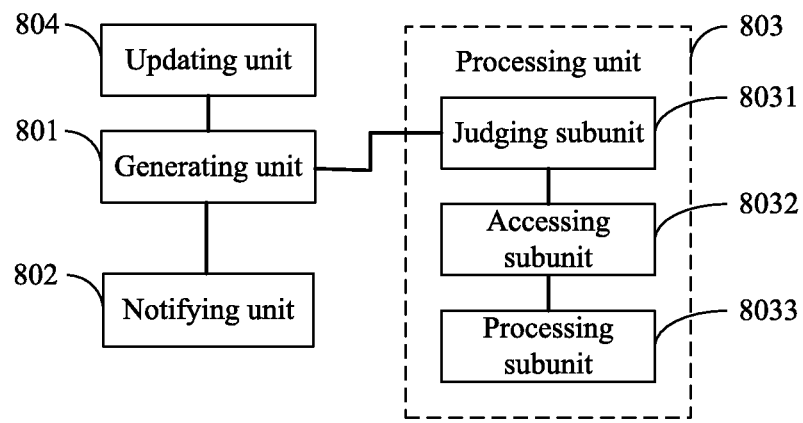
FIG. 8b is another schematic structural diagram of a network-side device according to an embodiment of the present invention.

As shown in FIG. 8b, the processing unit 803 may include a judging subunit 8031, an accessing subunit 8032, and a processing subunit 8033. The judging subunit 8031 is configured to determine whether to allow the access of the machine terminal according to the authorized period and/or forbidden period generated by the generating unit 801 after receiving the access request of the machine terminal. For example, the judging subunit 8031 is configured to judge whether the current time falls within the authorized period or falls beyond the forbidden period.

The accessing subunit 8032 is configured to allow the access of the machine terminal when the judging subunit 8031 determines that the current time falls within the authorized period or beyond the forbidden period. The processing subunit 8033 is configured to deny access of the machine terminal when the judging subunit 8031 determines no, for example, when the judging subunit 8031 determines that the current time falls beyond the authorized period or falls within the forbidden period. Alternatively, the processing subunit 8033 allows the access of the machine terminal but adds a label for the current access so that predetermined processing is performed according to the label such as, for example, extra charging.

It should be noted that the first access request refers to a request message for obtaining an authorized period and/or a forbidden period. In the specific implementation, the first access request may be set according to protocol requirements corresponding to specific application environment. For example, the first access request may be specifically an Attach request.

As shown in FIG. 8b, the network-side device may further include an updating unit 804. The generating unit 801 is further configured to generate a new authorized period and/or forbidden period.

The updating unit 804 is configured to allow the access of the machine terminal when determining, according to an old authorized period and/or forbidden period, that the access of the machine terminal is legal. The updating unit 804 is further configured to notify the new authorized period and/or forbidden period generated by the generating unit 801 to the machine terminal. Alternatively, when determining that the access of the machine terminal is legal, the updating unit 804 is configured to notify the new authorized period and/or forbidden period generated by the generating unit 801 to the machine terminal and allow the access of the machine terminal after determining that the access of the machine terminal is legal.

In the specific implementation, the network-side device may be implemented by an independent entity or may be implemented by multiple entities. For example, the network-side device may specifically include a network management device/MTC platform, an SGSN/GGSN, an MTC server, and an HLR/HSS.

For the specific implementation of the preceding units, reference may be made to the preceding embodiments. The details are not repeatedly described herein.

In this embodiment, the generating unit 801 of the network-side device may generate authorized periods and/or forbidden periods of all time-controlled subscriptions, authorized periods and/or forbidden periods of a type of time-controlled subscriptions, or an authorized period and/or a forbidden period of a particular time-controlled subscription according to information such as network service load historical data and application information of the time-controlled subscription. The processing unit 803 controls network access of the machine terminal according to the authorized period and/or forbidden period. Because the network access time of the machine terminal can be controlled flexibly, the communication of the machine terminal can be controlled flexibly, and the adverse impact of machine terminal communication on ordinary terminal communication can be reduced. For example, preferably, the machine terminal is allowed to access the network during the service valley period of the operator network, which avoids possible network congestion, reduces the adverse impact on ordinary terminal communication, and also guarantees the communication quality of the machine terminal while ensuring the communication quality of the ordinary terminal.

Figure 9:
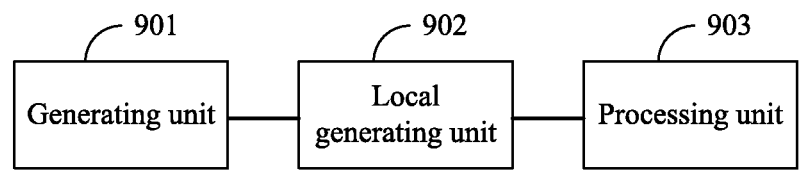
FIG. 9 is still another schematic structural diagram of a network-side device according to an embodiment of the present invention.

Because actual application environment such as time zone and service load in different areas is different, to better adapt to the actual requirement, a ninth embodiment of the present invention further provides another network-side device. As shown in FIG. 9, the network-side device includes a generating unit 901, a local generating unit 902, and a processing unit 903.

The generating unit 901 is configured to generate an authorized period and/or a forbidden period of a time-controlled subscription according to requirement information. The requirement information includes application information of the time-controlled subscription and network service load historical data, which is described in the foregoing embodiments.

The local generating unit 902 is configured to generate a local authorized period and/or forbidden period according to the authorized period and/or forbidden period of the time-controlled subscription generated by the generating unit 901 and a predetermined local policy.

The processing unit 903 is configured to send the local authorized period and/or forbidden period generated by the local generating unit 902 to the machine terminal and control access of a machine terminal according to the local authorized period and/or forbidden period after receiving an access request of the machine terminal. In some cases, the processing unit 903 is also configured to randomly generate a communication window within the local authorized period generated by the local generating unit 902 and/or a non-forbidden period and send the communication window to the machine terminal and control access of the machine terminal according to the communication window after receiving the access request of the machine terminal. For example, it is judged whether the current time falls within the local authorized period or falls beyond the local forbidden period and, if so, the access of the machine terminal is allowed. Otherwise, if the current time falls beyond the local authorized period or falls within the local forbidden period, the access of the machine terminal is denied or the access of the machine terminal is allowed but a label is added for the current access so that predetermined processing is performed according to the label.

This embodiment can achieve the beneficial effect of the network-side device in the eighth embodiment. In addition, the local generating unit 902 can generate a local authorized period and/or forbidden period more suitable for the local actual environment according to the basic authorized period and/or forbidden period and a local policy. Further, the local generating unit 902 can more flexibly control the network access of the machine terminal of the time-controlled subscription.

Figure 10A:
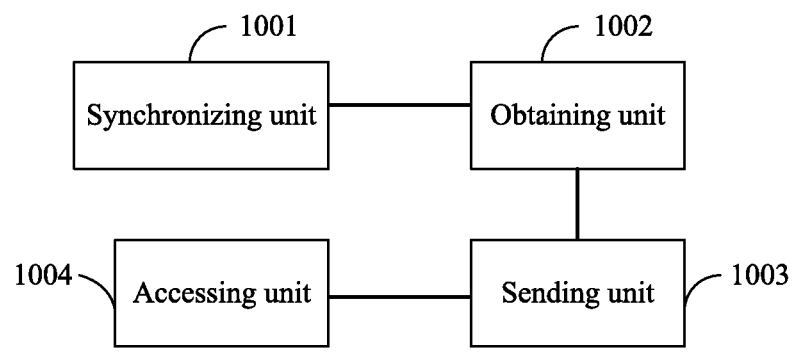
FIG. 10a is a schematic structural diagram of a terminal according to an embodiment of the present invention.

A tenth embodiment of the present invention further provides a machine terminal. As shown in FIG. 10a, the machine terminal includes a synchronizing unit 1001, an obtaining unit 1002, a sending unit 1003, and an accessing unit 1004.

The synchronizing unit 1001 is configured to perform time synchronization with a network-side system. For example, the synchronization is implemented through the GPS or by receiving the system time broadcast by a mobile network. For example, the network side may broadcast the system time with an authorized period and/or a forbidden period to a machine terminal or the time synchronization may be performed when the machine terminal communicates with an MTC server.

The obtaining unit 1002 is configured such that after the synchronizing unit 1001 performs the time synchronization, the obtaining unit 1002 obtains at least one parameter of an authorized period and/or a forbidden period of a time-controlled subscription, a local authorized period and/or forbidden period, or a communication window. The communication window is randomly generated by a network-side device within the local authorized period and/or a non-forbidden period, the local authorized period and/or forbidden period is generated by the network-side device according to the authorized period and/or forbidden period of the time-controlled subscription and a predetermined local policy, and the authorized period and/or forbidden period of the time-controlled subscription is generated by the network-side device according to requirement information.

The requirement information includes network service load historical data and application information of the time-controlled subscription. The requirement information may further include information such as the system maintenance time and/or an authorized period and/or a forbidden period of an existing time-controlled subscription, details of which are disclosed in the foregoing embodiment and not repeatedly described herein.

The sending unit 1003 is configured to send an access request to the network-side device according to at least one parameter of the authorized period and/or forbidden period of the time-controlled subscription, the local authorized period and/or forbidden period, or the communication window obtained by the obtaining unit 1002. For example, when the machine terminal has communication need and the current time falls within the authorized period (or non-forbidden period), the machine terminal may execute a randomization operation for starting communication. In other words, the machine terminal randomly selects a certain time point within the authorized period to sends the access request to the network-side device.

As used herein, the access request refers to various request messages sent by the machine terminal for accessing a network. In the specific implementation, different request messages may be used according to protocol requirements of different networks. For example, an Attach request message may be used in a GPRS network, the details of which are disclosed in the prior art and are not repeatedly described herein.

The accessing unit 1004 is configured to access the network when the network-side device determines to allow the access according to the access request and at least one parameter of the authorized period and/or forbidden period of the time-controlled subscription, the local authorized period and/or forbidden period, or the communication window stored by the network-side device. In other words, access to the network is permitted when the network-side device determines, according to the authorized period and/or forbidden period of the time-controlled subscription and the access request sent by the sending unit 1003, or the local authorized period and/or forbidden period and the access request sent by the sending unit 1003, or the communication window and the access request sent by the sending unit 1003, that the access is legal.

For example, the network-side device may judge, according to the access request and the authorized period and/or forbidden period, whether the current time falls within the authorized period or falls beyond the forbidden period. If so, the access of the machine terminal is allowed. Otherwise, if the current time falls beyond the authorized period or still falls within the forbidden period, the access of the machine terminal is denied.

Optionally, the machine terminal may also include a receiving unit, configured to receive a prompt sent by the network-side device about why the access is denied. The obtaining unit 1002 is specifically any one of a first obtaining subunit, a second obtaining subunit, or a third obtaining subunit. The first obtaining subunit is configured to receive at least one type of authorized periods and/or forbidden periods of all time-controlled subscriptions, authorized periods and/or forbidden periods of a certain type of time-controlled subscriptions, or an authorized period and/or a forbidden period of a certain time-controlled subscription broadcast by the network-side device through a CBS.

The second obtaining subunit is configured to receive at least one type of the authorized periods and/or forbidden periods of all time-controlled subscriptions, authorized periods and/or forbidden periods of a certain type of time-controlled subscriptions, or an authorized period and/or a forbidden period of a certain time-controlled subscription broadcast by the network-side device through a cell system parameter. The third obtaining subunit is configured to send a first access request to the network-side device and receive the authorized period and/or forbidden period of the time-controlled subscription returned by the network-side device according to the first access request.

For example, the third obtaining subunit may receive the local authorized period and/or forbidden period, or authorized period and/or forbidden period of the time-controlled subscription, or communication window returned by the network-side device, The communication window is randomly generated by the network-side device within the local authorized period and/or a non-forbidden period, the local authorized period and/or forbidden period is generated by the network-side device according to the authorized period and/or forbidden period of the time-controlled subscription and a predetermined local policy.

The "authorized period and/or forbidden period of the time-controlled subscription" may be authorized periods and/or forbidden periods of all time-controlled subscriptions, or authorized periods and/or forbidden periods of a certain type of time-controlled subscriptions, or an authorized period and/or a forbidden period of a certain time-controlled subscription. The predetermined local policy may be set according to specific environment or application such as, for example, time zone or service load.

In addition, the first access request refers to a request message for obtaining an authorized period and/or a forbidden period, and in the specific implementation, may be set according to protocol requirements corresponding to specific application environment. For example, the first access request may be specifically an Attach request.

Figure 10B:
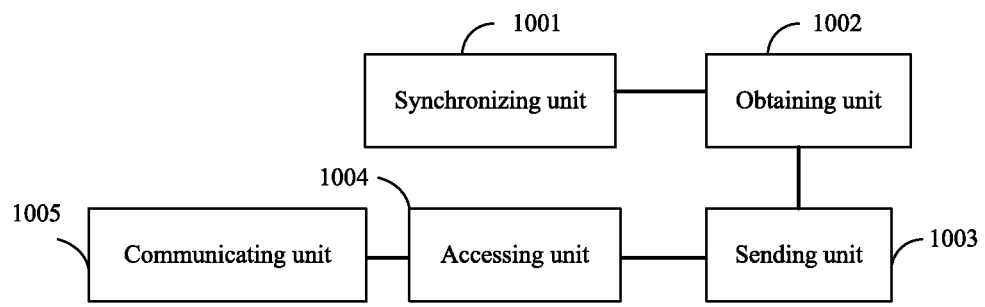
FIG. 10b is another schematic structural diagram of a terminal according to an embodiment of the present invention.

As shown in FIG. 10b, the terminal further includes a communicating unit 1005. The communicating unit 1005 is configured to initiate PDP connection activation after the accessing unit 1004 accesses the network and communicate with the network-side device. Alternatively, the terminal is configured to use a default bearer to communicate with the network-side device. In still other examples, the terminal is configured to create a dedicated bearer and use the created bearer to communicate with the network-side device.

The specific embodiments of the units are described in the foregoing embodiments, and are not repeatedly described herein. In this embodiment, the obtaining unit 1002 of a machine terminal may obtain an authorized period and/or a forbidden period of a time-controlled subscription and then the accessing unit 1004 accesses a network according to the authorized period and/or forbidden period. The authorized period and/or forbidden period is generated by the network-side device according to information such as network service load historical data, system maintenance time, and application information of a time-controlled subscription. Because the network access time of the machine terminal can be controlled flexibly, communication of the machine terminal can be controlled flexibly, and impacts of machine terminal communication on ordinary terminal communication can be reduced. For example, the machine terminal is allowed to access the network during a service valley period of an operator network, which avoids possible network congestion, reduces impacts on the ordinary terminal communication, and also guarantees the communication quality of the machine terminal while ensuring the communication quality of an ordinary terminal.

An eleventh embodiment of the present invention further provides a communication system which includes any network-side device provided by the embodiments of the present invention and may further include any terminal provided by the embodiments of the present invention. The details are disclosed in the foregoing embodiments and are not repeatedly described herein.

As seen from the foregoing embodiments, the network-side device of the communication system provided by the embodiment may generate an authorized period and/or a forbidden period of a time-controlled subscription according to information such as network service load historical data and application information of the time-controlled subscription, and then control network access of a machine terminal according to the authorized period and/or the forbidden period. Because the network access time of the machine terminal can be controlled flexibly, communication of the machine terminal can be controlled flexibly, and impacts of machine terminal communication on ordinary terminal communication can be reduced. For example, the machine terminal is allowed to access a network during a service valley period of an operator network, which avoids possible network congestion, reduces impacts on the ordinary terminal communication, and also guarantees the communication quality of the machine terminal while ensuring the communication quality of an ordinary terminal.

Persons of ordinary skill in the art may understand that all or part of the steps in the various methods in the foregoing embodiments may be implemented by a program instructing relevant hardware. The program may be stored in a readable storage medium of a computer. The storage media may include a read only memory (ROM), a random access memory (RAM), a magnetic disk, or an optical disk.

Detailed above are a method and an apparatus for controlling network access of a machine terminal according to the embodiments of the present invention. Although the principle and implementation of the present invention are described through some exemplary embodiments, the embodiments are only intended to help understand the method and core idea of the present invention. In addition, with respect to the implementation and application scope, modifications and variations may be made by persons of ordinary skill in the art according to the idea of the present invention. Therefore, the specification shall not be understood as a limitation to the present invention.

What is claimed is:

1. A method for controlling network access of a machine terminal, the method comprising:
   generating, by a network-side device, an authorized period and a forbidden period of a first time-controlled subscription for a first type of machine terminal application according to requirement information, wherein the requirement information comprises application information of the first time-controlled subscription, system maintenance information, application type, and network service load historical data;
   generating, by the network-side device, an authorized period and a forbidden period of a second time-controlled subscription for a second type of machine terminal application according to requirement information, wherein the requirement information comprises application information of the second time-controlled subscription, system maintenance information, application type, and network service load historical data, and wherein the first type of machine terminal application is a different type than the second type of machine terminal application, and wherein the authorized and forbidden periods of the first time-controlled subscription are different than the authorized and forbidden periods of the second time-controlled subscription;
   notifying the authorized period and the forbidden period of the first time-controlled subscription to a first machine terminal comprising the first type of machine terminal application;
   notifying the authorized period and the forbidden period of the second time-controlled subscription to a second machine terminal comprising the second type of machine terminal application;
   controlling access of the first machine terminal according to the authorized period and the forbidden period of the first time-controlled subscription after receiving an access request of the first machine terminal; and
   controlling access of the second machine terminal according to the authorized period and the forbidden period of the second time-controlled subscription after receiving an access request of the second machine terminal.

2. The method according to claim 1, wherein the notifying the authorized period and the forbidden period of the first time-controlled subscription to the first machine terminal comprises at least one of broadcasting the authorized period and the forbidden period of the first time-controlled subscription to the first machine terminal through a cell broadcast service.

3. The method according to claim 1, wherein the notifying the authorized period and the forbidden period of the first time-controlled subscription to the first machine terminal comprises broadcasting the authorized period and/or the forbidden period of the first time-controlled subscription to the first machine terminal by a cell system parameter.

4. The method according to claim 1, wherein the notifying the authorized period and the forbidden period of the first time-controlled subscription to the first machine terminal comprises:
   receiving a first access request sent by the first machine terminal; and sending the authorized period and the forbidden period of the first time-controlled subscription to the first machine terminal according to the first access request.

5. The method according to claim 4, wherein the first access request carries an indication for obtaining the authorized period and the forbidden period of the first time-controlled subscription.

6. The method according to claim 1, wherein the controlling access of the first machine terminal comprises:
determining whether to allow the access of the first machine terminal according to the authorized period and the forbidden period of the first time-controlled subscription.

7. The method according to claim 6, further comprising allowing the access of the first machine terminal or denying the access of the first machine terminal.

8. The method according to claim 6, further comprising:
allowing the access of the first machine terminal; and
adding a label for a current access so that predetermined processing is performed according to the label.

9. The method according to claim 1, further comprising:
determining whether the first machine terminal is a machine terminal of the first time-controlled subscription; and
executing the control of the access of the first machine terminal according to the authorized period and the forbidden period of the first time-controlled subscription if the first machine terminal is of the first time-controlled subscription.

10. A method for network access of a machine terminal, the method comprising:
performing time synchronization with a network-side system, the time synchronization being performed using a global positioning system (GPS);
obtaining, by the machine terminal, a first authorized period and forbidden period of a time-controlled subscription, and a local authorized period and forbidden period, wherein the first authorized period and forbidden period of the time-controlled subscription are generated by a network-side device according to requirement information, wherein the requirement information comprises application information of the time-controlled subscription and network service load historical data; and the local authorized period and forbidden period is generated by the network-side device according to the first authorized period and forbidden period of the time-controlled subscription and a predetermined local policy;
sending an access request to the network-side device according to the obtained first authorized period and forbidden period of the time-controlled subscription and the local authorized period and forbidden period;
receiving a message from the network-side device in response to sending the access request, the message carrying a second authorized period and forbidden period of the time-controlled subscription, wherein the second authorized period and forbidden period of the time-controlled subscription was generated in response to the network-side device determining that additional terminals, a number of which exceed a preset threshold, have been added to the network, and wherein the second authorized period and forbidden period of the time-controlled subscription is different than the first authorized period and forbidden period of the time-controlled subscription; and
after receiving the message from the network-side device, accessing a network when the network-side device determines to allow the access according to the access request and the first authorized period and forbidden period of the time-controlled subscription and the local authorized period and forbidden period.

11. The method according to claim 10, wherein the obtaining comprises obtaining at least one of authorized periods and forbidden periods of all time-controlled subscriptions, authorized periods and forbidden periods of a certain type of time-controlled subscriptions, or an authorized period and a forbidden period of a certain time-controlled subscription broadcast by the network-side device through a cell broadcast service.

12. The method according to claim 10, wherein the obtaining comprises obtaining at least one type of authorized periods and forbidden periods of all time-controlled subscriptions, authorized periods and forbidden periods of a certain type of time-controlled subscriptions, or an authorized period and/or a forbidden period of a certain time-controlled subscription broadcast by the network-side device through a cell system parameter.

13. The method according to claim 10, wherein the obtaining comprises:
sending a first access request to the network-side device; and
receiving the first authorized period and forbidden period of the time-controlled subscription returned by the network-side device according to the first access request.

14. The method according to claim 13, wherein the first access request carries an indication for obtaining the first authorized period and the forbidden period.

15. A machine terminal, comprising:
a processor; and
a computer-readable storage medium storing a program to be executed by the processor, the program including instructions for:
performing time synchronization with a network-side system;
obtaining an authorized period and a forbidden period of a first time-controlled subscription, wherein the authorized period and forbidden period of the first time-controlled subscription, and an authorized period and a forbidden period of a second time-controlled subscription, are generated by a network-side device according to requirement information, the requirement information comprising application information of the first time-controlled subscription and the second time-controlled subscription and network service load historical data, wherein the first time-controlled subscription corresponds to a device type of the machine terminal and the second time-controlled subscription corresponds to a device type of another machine terminal, the another machine terminal having a different device type than the machine terminal, and wherein the authorized period and the forbidden period of the first time-controlled subscription are different than the authorized period and the forbidden period of the second time-controlled subscription;
sending an access request to the network-side device according to the authorized period and forbidden period of the first time-controlled subscription; and
accessing a network when the network-side device determines to allow the access according to the access request and the authorized period and forbidden period of the first time-controlled subscription.

16. The machine terminal according to claim 15, wherein the program further includes instructions for obtaining the authorized period and the forbidden period of the first time-controlled subscription broadcast by the network-side device through a cell system parameter.

17. The machine terminal according to claim 15, wherein the program further includes instructions for sending a first access request to the network-side device and obtaining the authorized period and the forbidden period of the first time-controlled subscription returned by the network-side device according to the first access request.

* * * * *